US008547579B2

(12) United States Patent
Mitsumatsu

(10) Patent No.: US 8,547,579 B2
(45) Date of Patent: Oct. 1, 2013

(54) IMAGE RECORDING SYSTEM AND CONTROLLING METHOD THEREOF

(75) Inventor: Jun Mitsumatsu, Sagamihara (JP)

(73) Assignee: Riso Kagaku Corporation, Tokyo (JP)

( * ) Notice: Subject to any disclaimer, the term of this patent is extended or adjusted under 35 U.S.C. 154(b) by 422 days.

(21) Appl. No.: 12/883,398

(22) Filed: Sep. 16, 2010

(65) Prior Publication Data

US 2011/0002010 A1 Jan. 6, 2011

Related U.S. Application Data

(63) Continuation of application No. PCT/JP2009/001124, filed on Mar. 13, 2009.

(30) Foreign Application Priority Data

Mar. 24, 2008 (JP) .................................. 2008-075337

(51) Int. Cl.
*G06F 3/12* (2006.01)
*G06K 15/00* (2006.01)
*H04N 1/60* (2006.01)

(52) U.S. Cl.
USPC ......... 358/1.15; 358/1.9; 358/1.12; 358/1.14; 358/1.18; 358/1.8; 347/14; 347/15; 347/19; 382/101; 382/112

(58) Field of Classification Search
None
See application file for complete search history.

(56) References Cited

U.S. PATENT DOCUMENTS

| 7,903,844 | B2* | 3/2011 | Satonaga et al. | 382/112 |
| 2006/0214971 | A1* | 9/2006 | Yamazaki | 347/15 |
| 2008/0074453 | A1* | 3/2008 | Furukawa | 347/14 |
| 2009/0141314 | A1* | 6/2009 | Yamamoto | 358/443 |
| 2009/0154766 | A1* | 6/2009 | Quine et al. | 382/101 |
| 2011/0316925 | A1* | 12/2011 | Saita | 347/19 |

FOREIGN PATENT DOCUMENTS

| JP | 2000-158772 A | 6/2000 |
| JP | 2000-343797 A | 12/2000 |
| JP | 2002-166634 A | 6/2002 |
| JP | 2003-011336 A | 1/2003 |
| JP | 2003-182053 A | 7/2003 |
| JP | 2004-034413 A | 2/2004 |
| JP | 2004-268449 A | 9/2004 |

OTHER PUBLICATIONS

Japanese Office Action dated Nov. 29, 2011 in counterpart Japanese Application No. 2008-075337.
International Search Report dated Apr. 28, 2009 (in English) in counterpart International Application No. PCT/JP2009/001124.

* cited by examiner

*Primary Examiner* — Satwant Singh
(74) *Attorney, Agent, or Firm* — Holtz, Holtz, Goodman & Chick, PC

(57) ABSTRACT

An image recording system includes a print data processing unit for performing a control for recording a predetermined recording failure check pattern after print data is recorded on a recording medium for each job, and a recording failure checking unit for determining whether or not there is a recording failure in a check image based on a recording failure check pattern obtained by capturing the check image with a check image obtaining unit.

14 Claims, 20 Drawing Sheets

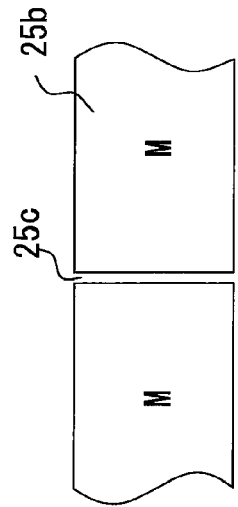
FIG. 7C
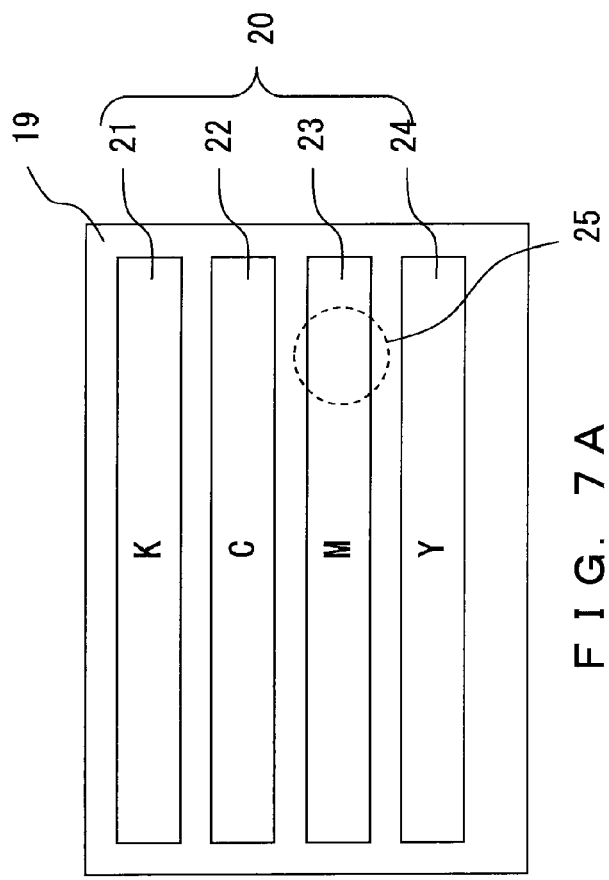
FIG. 7A
FIG. 7B

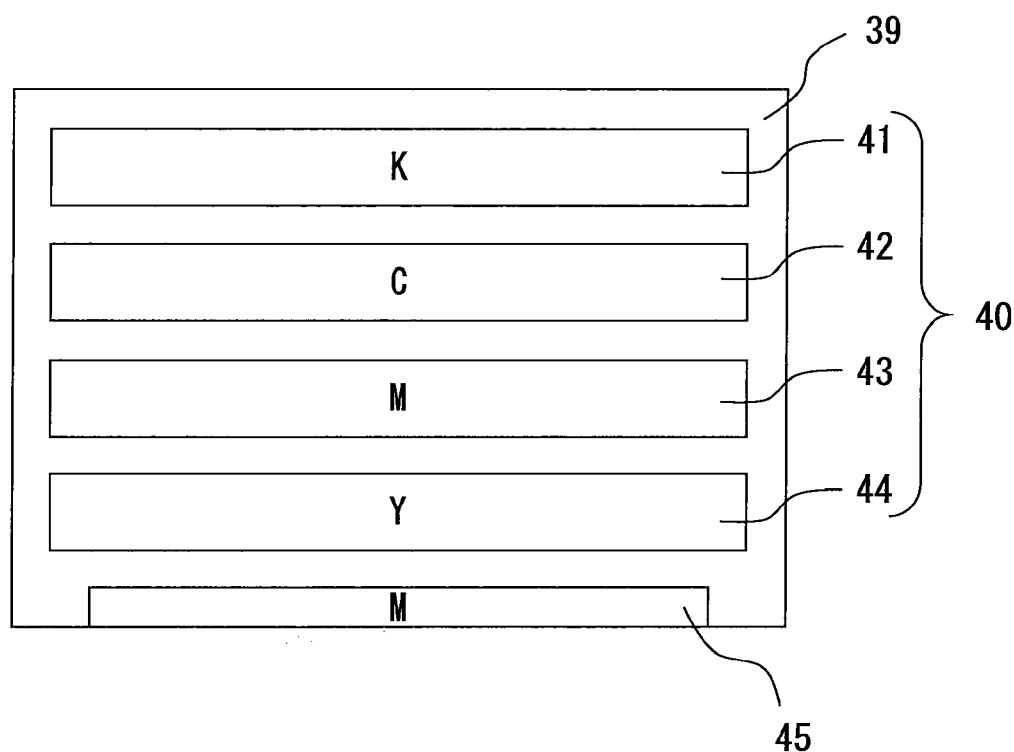
F I G. 1 1

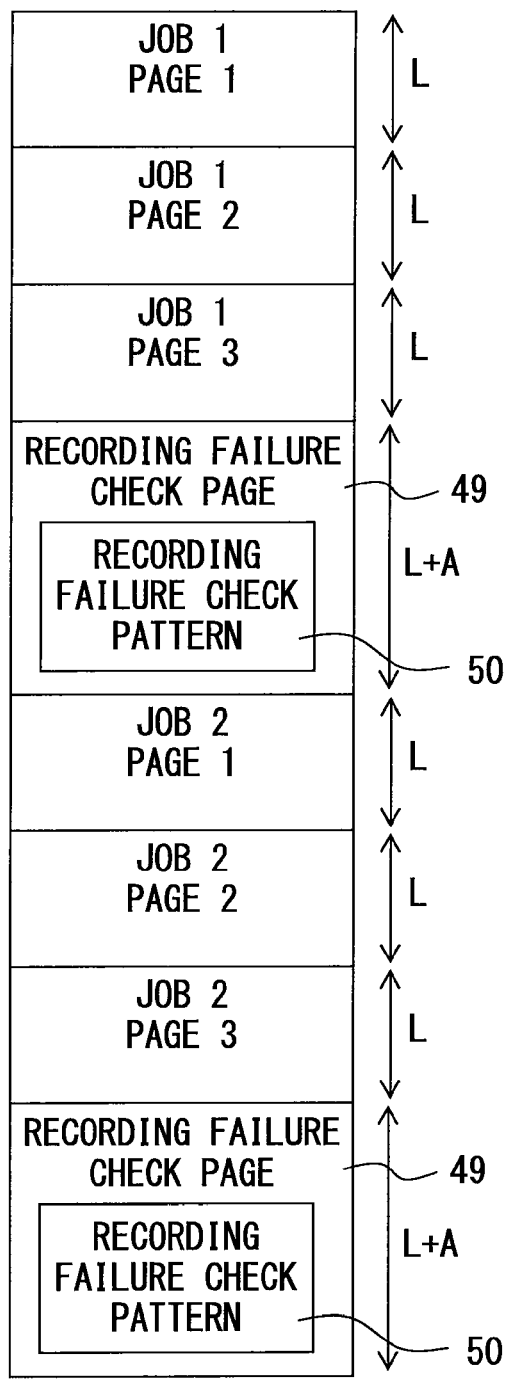
F I G. 15

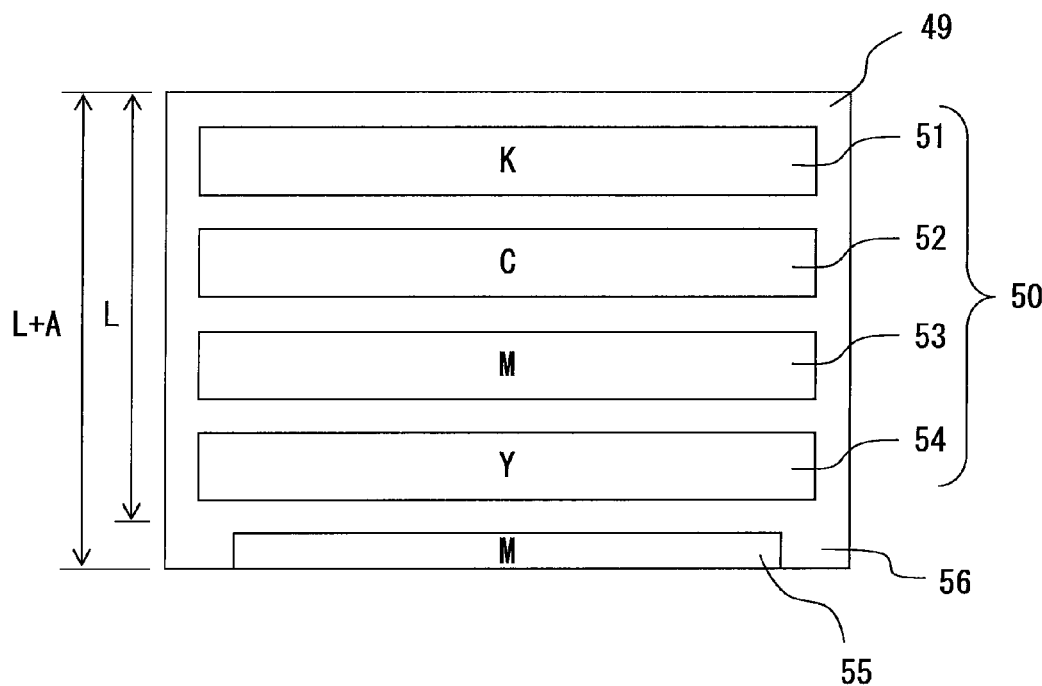
F I G. 16

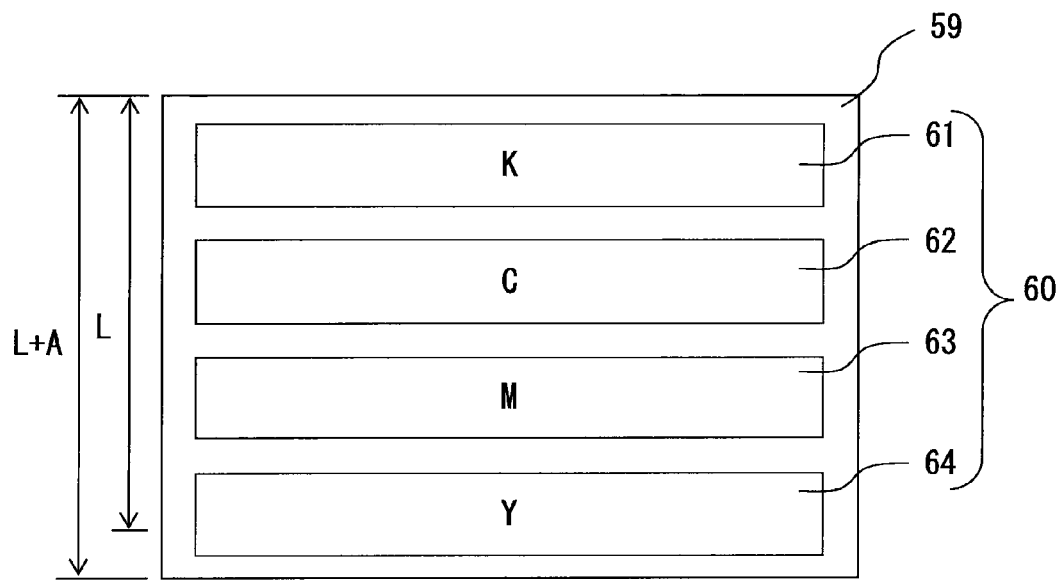
F I G. 1 7

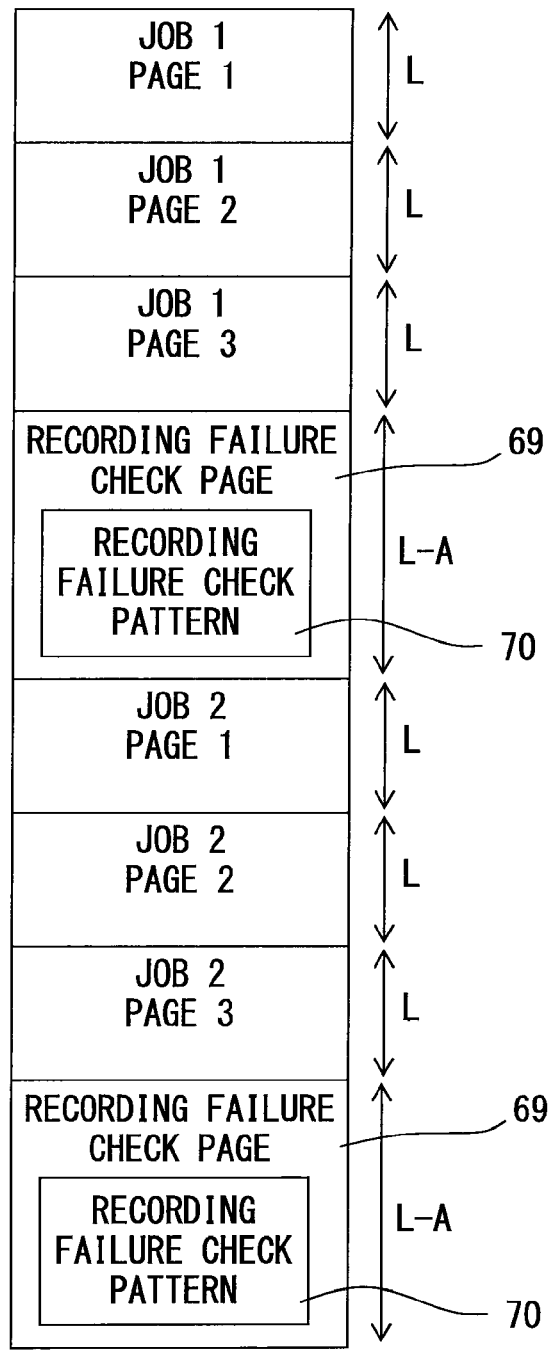
F I G. 1 9

IMAGE RECORDING SYSTEM AND CONTROLLING METHOD THEREOF

CROSS-REFERENCE TO RELATED APPLICATIONS

This is a Continuation Application of PCT Application No. PCT/JP2009/001124 filed Mar. 13, 2009, which was not published under PCT Article 21(2) in English.

This application is based upon and claims the benefit of priority from the prior Japanese Patent Application No. 2008-075337, filed Mar. 24, 2008, the entire contents of which are incorporated herein by this reference.

FIELD

The present invention relates to an image recording technique for recording an image by establishing ink on a recording medium such as paper, a film or the like, and more particularly, to an image recording system having a function of detecting a recording failure that can occur in a recording process executed on a recording medium, and to a controlling method of an image recording system.

BACKGROUND

Image recording apparatuses for recording a color image by jetting ink onto a continuous recording medium wound in the form of a roll, such as a large volume of paper, a film or the like, or onto a recoding medium (cut sheet) cut in advance in a predetermined size are known.

On cut sheets, such image recording apparatuses record a different image onto one recording medium that forms each page while conveying the recording medium at a speed as fast as several tens to several hundreds m/min. Moreover, continuous paper on which images are recorded is cut into pages and ejected.

In such high-speed image recording apparatuses, means for verifying, in real time, whether or not print data transmitted from a higher-order device of an image recording apparatus and an actual image recorded on a recording medium match is provided. However, since this verification needs to be processed at high speed, an expensive image processing system is demanded.

For example, Japanese Laid-open Patent Publication No. 2003-11336 discloses a technique for detecting such a recording failure.

According to Japanese Laid-open Patent Publication No. 2003-11336, at least one ruled line is printed between pages, and an image of the printed ruled line is captured by image capturing means. The captured image of the ruled line is checked by being compared with a captured image of a ruled line for a check, which is input in advance and printed in a normal state.

SUMMARY

One embodiment of the present invention is an image recording system for recording an image on a recording medium based on job information including print data. The image recording system includes: an image capturing unit for capturing an image of the recording medium on which the image is recorded; a higher-order device having an input unit for selecting the job information in predetermined printing units; a print data processing unit for recording a predetermined check image before the print data is recorded on the recording medium or after the print data is recorded on the recording medium in the printing units; and a recording failure checking unit for determining whether or not an ink jetting failure occurs on the recorded check image.

Another aspect of the present invention is a controlling method of an image recording system for recording an image on a recording medium based on job information including print data. The controlling method includes: an image capturing step of capturing an image of the recording medium on which the image is recorded; and a step of selecting the job information in predetermined printing units, wherein the recording medium is a cut sheet cut in a predetermined length, a predetermined check image is recorded at an edge of the cut sheet on an upstream side or a downstream side of a conveyance direction, and a separator marker is recorded in the proximity of the check image, a print data process for performing a control for recording the check image before the print data is recorded on the recording medium or after the print data is recorded on the recording medium in predetermined printing units is executed, and a recording failure check for determining whether or not an ink jetting failure occurs in the recorded check image is performed.

A further aspect of the present invention is a controlling method of an image recording system for recording an image on a recording medium based on job information including print data. The controlling method includes an image capturing step of capturing an image of the recorded recording medium; and a cutting step of cutting a continuous medium as the recording medium in a predetermined size, wherein a portion in which the print data is recorded and a portion in which a predetermined check image is recorded are cut in a same size in the cutting step, a print data process for performing a control for recording the check image before the print data is recorded on the recording medium or after the print data is recorded on the recording medium in predetermined printing units is executed, and a recording failure check for determining whether or not an ink jetting failure occurs in the recorded check image is performed.

BRIEF DESCRIPTION OF DRAWINGS

FIGS. 7A to 7C illustrate one example of a recording failure check pattern;
FIG. 11 illustrates one example of a recording failure check pattern and a separator marker.

FIG. 15 is a conceptual schematic of a recording medium after being printed;

FIG. 16 illustrates one example of a recording failure check pattern and a separator marker;

FIG. 17 illustrates another example of a recording failure check pattern and a separator marker;

FIG. 19 is a conceptual schematic of a recording medium after being printed.

DESCRIPTION OF EMBODIMENTS

Embodiments according to the present invention are described below with reference to the drawings.

First Embodiment

Figure 1:
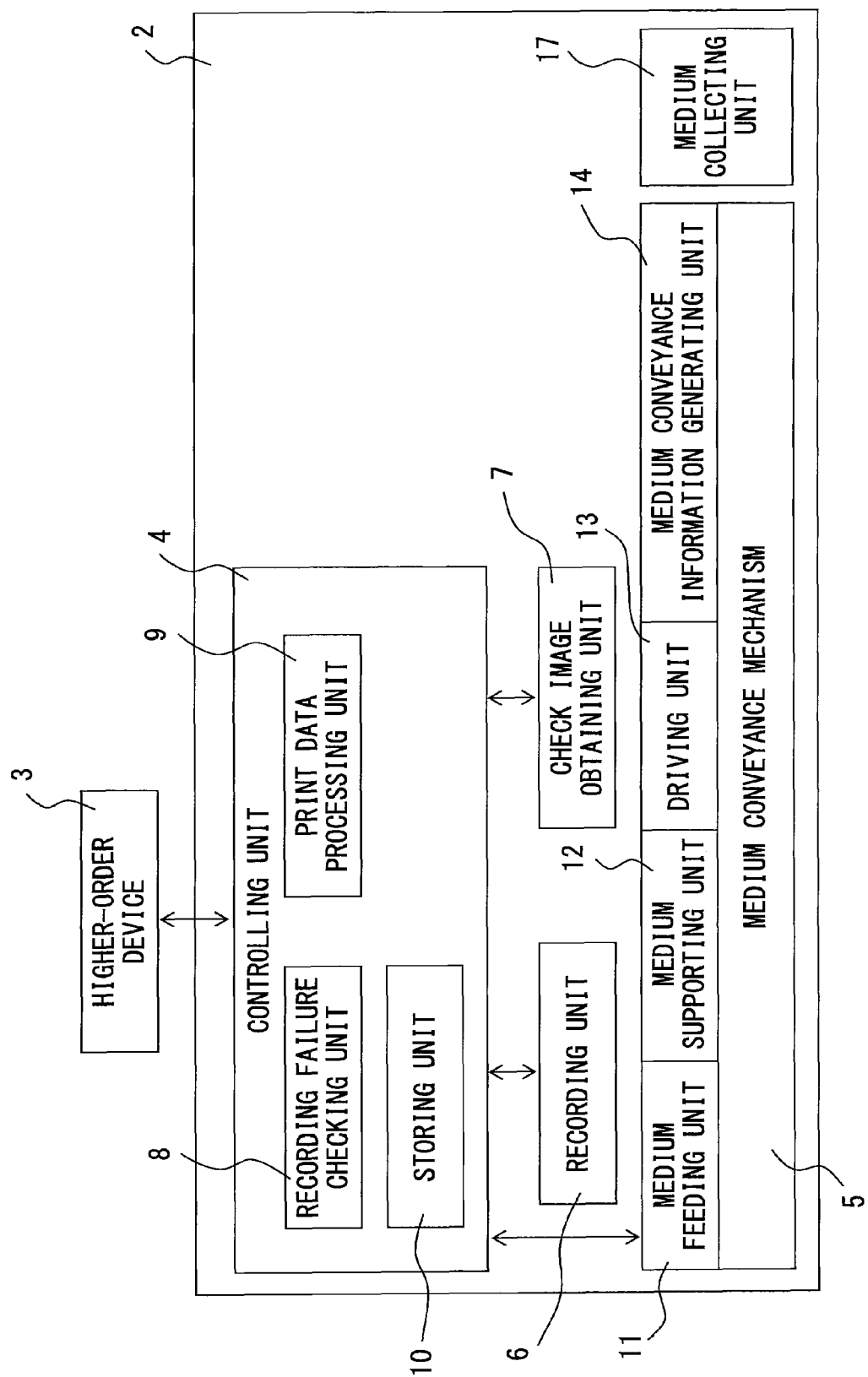
FIG. 1 is a block diagram illustrating functions of an image recording system according to a first embodiment of the present invention.
Figure 2:
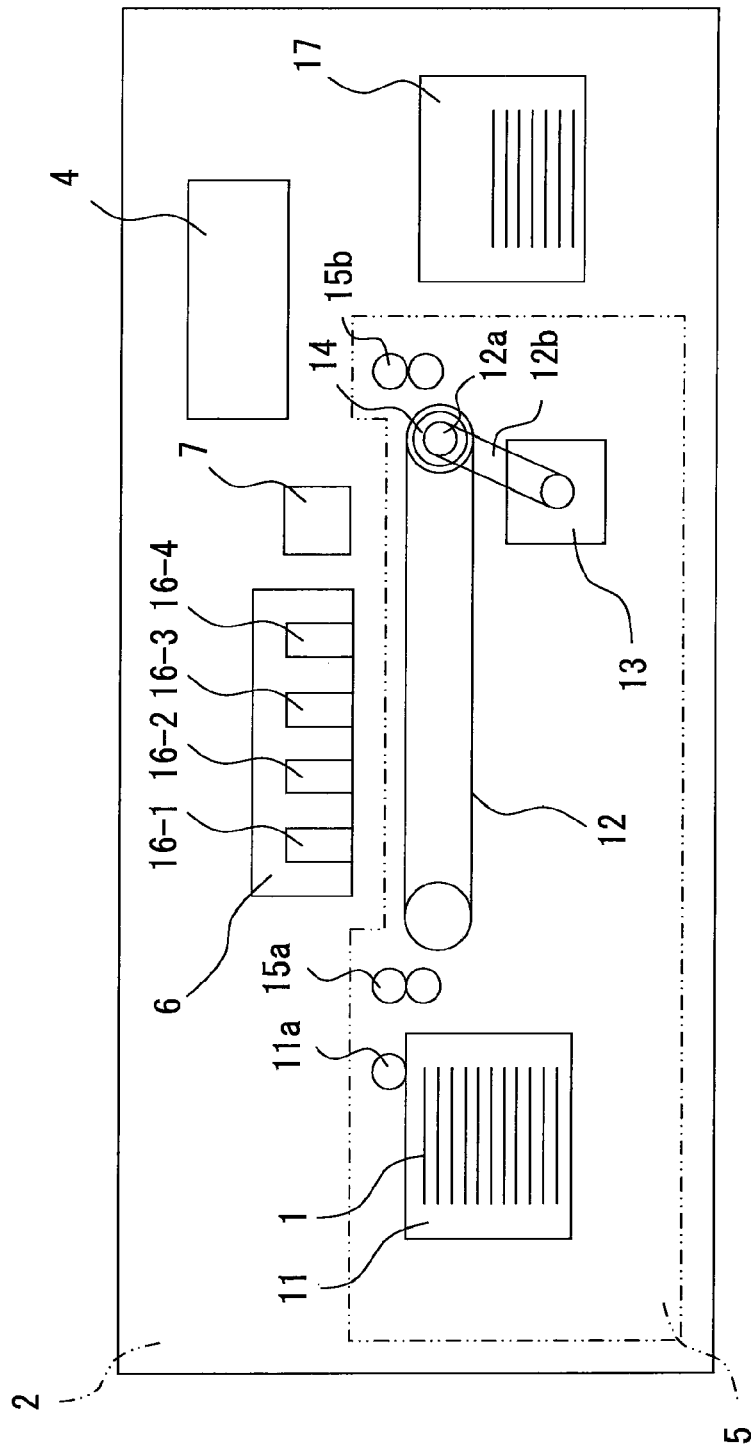
FIG. 2 illustrates a configuration of a mechanism portion of the image recording system according to the first embodiment.

FIG. 1 is a block diagram illustrating functions of an image recording system. FIG. 2 illustrates a configuration of a mechanism portion. Assume that a conveyance direction of a recording medium 1 is a sub-scanning direction and a direction orthogonal to the sub-scanning direction is a main scanning direction.

The recording medium 1 is, for example, paper or a film, and is formed in the shape of a sheet in a predetermined size.

To an image recording apparatus 2, a higher-order device 3 is connected via a LAN (Local Area Network) or the like. The higher-order device 3 transmits print data (image data) composed of an image, a character and the like.

The higher-order device 3 transmits an instruction to execute a recording process to the image recording apparatus 2, and then transmits print data that is a base of a recording process in a format such as PostScript (a format for representing a graphic or character to be printed with a computer).

The image recording apparatus 2 receives the print data transmitted from the higher-order device 3, and jets and establishes ink onto the recording medium 1 based on the print data. In this way, the recording process for recording an image on the recording medium 1, and a recording failure check process for checking a recording failure that can occur at the time of the recording process are executed.

The image recording apparatus 2 comprises at least a controlling unit 4, a medium conveyance mechanism 5, a recording unit 6, a check image obtaining unit 7 as an image capturing unit, and a medium collecting unit 17.

The controlling unit 4 includes a processing circuit composed of, for example, an MPU (Micro Processor Unit), a ROM (Read Only Memory) for storing a control program, a RAM (Random Access Memory) that serves as a working memory of the MPU, and other components, a nonvolatile memory for storing setting values, etc. of a control of the image recording apparatus 2, and an interface for connecting the check image obtaining unit 7.

The MPU can control the respective components of the image recording apparatus 2 by executing a predetermined control program. By executing a predetermined control program with the MPU, the controlling unit 4 has a function of checking a recording failure with the recording failure checking unit 8, and a function of processing print data with the print data processing unit 9. The control unit 4 also includes a storing unit 10 for storing print data and the like.

The RAM is used also as the above described storing unit 10. Moreover, parameters, etc. used for a recording failure check are stored in the nonvolatile memory. The recording failure checking unit 8 may be configured also as a processing circuit (hardware) controlled by the MPU.

The controlling unit 4 receives the print data transmitted from the higher-order device 3, and respectively controls the medium conveyance mechanism 5, the recording unit and the check image obtaining unit 7 by executing a predetermined control program. Then, the recording process of an image onto the recording medium 1, and the recording failure check process for checking a recording failure in the recording process are executed.

As illustrated in FIGS. 1 and 2, the medium conveyance mechanism 5 has a function of conveying the recording medium 1 from a conveyance upstream side to a conveyance downstream side. The medium conveyance mechanism 5 includes a medium feeding unit 11, a medium supporting unit 12, a driving unit 13, a medium conveyance information generating unit 14, and rollers 15a, 15b. The medium feeding unit 11 holds the recording medium 1 before the recording process is executed, and feeds the recording medium 1 to the medium supporting unit 12 by rotating a medium feeding roller 11a in accordance with an instruction of the controlling unit 4.

A cut sheet that is cut in advance in a predetermined size is used as the recording medium 1.

The medium supporting unit 12 has a medium supporting unit holding member 12a, and a driving unit 13 such as a motor, etc. linked by a power transfer member 12b to the medium supporting unit holding member 12a. For example, a belt or the like is used as the power transfer member 12b. The recording medium 1 is conveyed by rotating the medium supporting unit holding member 12a with the driving of the driving unit 13.

The rollers 15a, 15b respectively arranged on the upstream side and the downstream side in the conveyance direction are provided so that the recording medium 1 is conveyed on a desired route of the conveyance path. The medium conveyance information generating unit 14 is configured with, for example, a rotary encoder, and is connected to the medium supporting unit holding member 12a. The medium conveyance information generating unit 14 generates a pulse signal corresponding to an amount of rotation of the medium supporting unit holding member 12a, namely, an amount of conveyance (an amount of move) of the recording medium 1, and notifies the controlling unit 4 of the amount with the pulse signal.

The recording unit 6 is provided so that it faces the medium conveyance mechanism 5. The recording unit 6 is configured by arranging recording heads 16-1 to 16-4 of colors such as K (black), C (cyan), M (magenta) and Y (yellow). The recording heads 16-1 to 16-4 are provided so that they are nearly parallel to the sub-scanning direction in order of K, C, M and Y from the upstream side of the conveyance path of the recording medium 1, and pluralities of nozzles of the recording heads 16-1 to 16-4 are arranged in parallel with the main scanning direction.

The recording heads 16-1 to 16-4 have a resolution of, for example, 300 dpi. Upon receipt of an instruction, issued from the controlling unit 4, to execute the printing process, the recording unit 6 executes the recording process on the recording medium 1 at predetermined timing that is synchronous with the pulse signal generated by the medium conveyance information generating unit 14.

Namely, the recording unit 6 executes the recording process of an image, a character or the like on the recording medium 1 by jetting inks of K, C, M and Y colors from the pluralities of nozzles of the recording heads 16-1 to 16-4.

Additionally, in this embodiment, the recording unit 6 forms, according to an instruction of the controlling unit 4, a recording failure check pattern for checking a recording failure on a page next to the last page of the recording medium in predetermined printing units of each piece of job information before starting the recording process of the next printing unit. In this embodiment, the predetermined printing unit is "1 job" to be described next.

1 job as the predetermined printing unit is described next with reference to FIGS. 3A to 3D.

This embodiment assumes that job information 1 is composed of pages 1 and 2 and job information 2 is composed of pages 1 to 3 in the printing instruction issued from the higher-order device 3. The following description is provided by taking, as an example, a case where two copies are printed for the job information 1 and one copy is printed for the job information 2.

Assume that a recording failure check page 19 is provided on a page next to the last page of 1 job, and a recording failure check pattern 20 is printed on the recording failure check page 19.

Figures 3A, 3B:
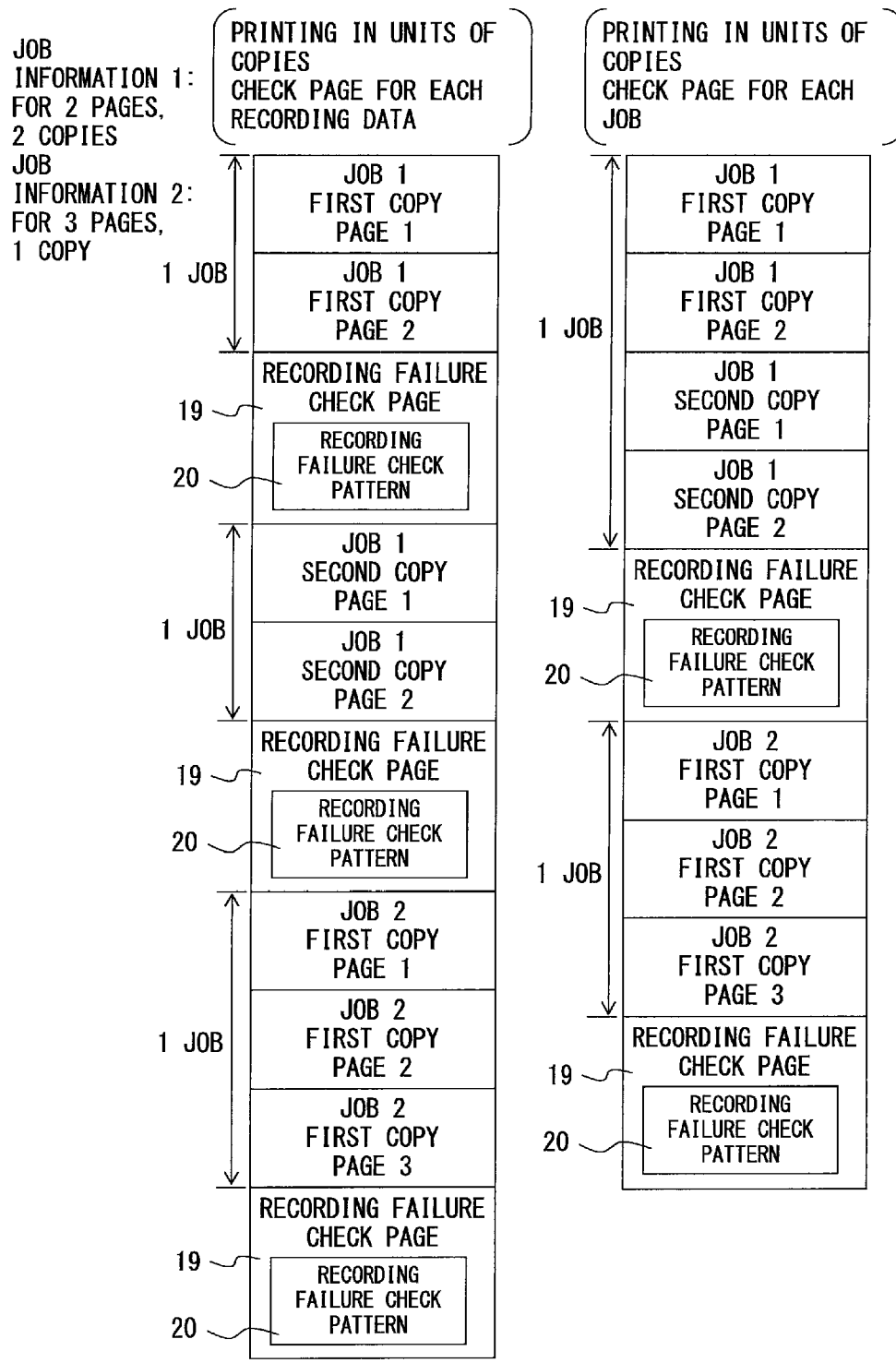
FIG. 3A illustrate example of a printing process.
FIG. 3B illustrate example of a printing process.

As illustrated in FIG. 3A, if the recording process is executed for many copies of print data composed of a plurality of pages, the recording process executed for each of the copies is referred to as "1 job".

Namely, after pages 1 and 2 of the first copy of the print data of the job information 1 are printed, the recording failure check pattern 20 is printed on the succeeding recording failure check page 19. Then, after pages 1 and 2 of the second copy of the print data of the job information 1 are printed, the recording failure check pattern 20 is printed on the succeeding recording failure check page 19. Moreover, after pages 1 to 3 of the print data of the job information 2 are printed, the recording failure check pattern 20 is printed on the succeeding recording failure check page 19.

Additionally, as illustrated in FIG. 3B, if an instruction to print a plural number of copies (such as 2 copies) of print data composed of a plurality of pages is issued from the higher-order device 3, the plural number of copies to be recorded according to one print instruction may be set as 1 job.

Namely, the pages 1 and 2 of the first copy of the print data of the job information 1 are printed, the pages 1 and 2 of the second copy are then printed, and the recording failure check pattern 20 is printed on the succeeding recording failure check page 19. Moreover, the pages 1 to 3 of the first copy of the print data of the job information 2 are printed, and the recording failure check pattern 20 is printed on the succeeding recording failure check page 19.

Moreover, either the recorded process executed for each copy or a plural number of copies according to one print instruction may be selectively set as 1 job depending on an instruction issued from the higher-order device 3.

Figures 3C, 3D:
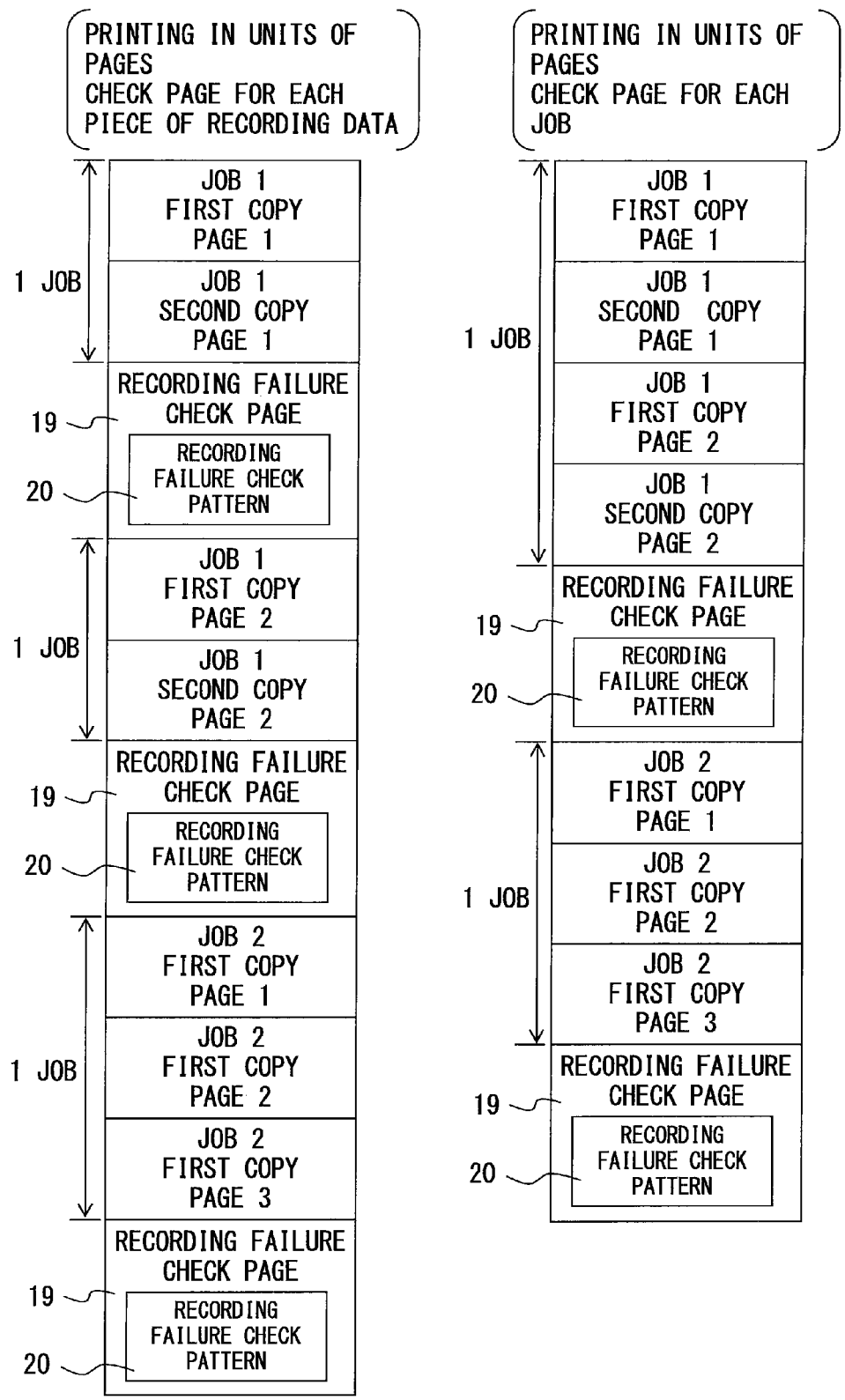
FIG. 3C illustrate example of a printing process.
FIG. 3D illustrate example of a printing process.

Additionally, as illustrated in FIG. 3C, if the recording process is sequentially executed for the same piece of print data when the recording process is executed for a plural number of copies of print data composed of a plurality of pages, 1 job is set as the completion of the recording process executed for the plural number of copies of the same piece of print data.

Namely, the page 1 of the first copy and the page 1 of the second copy of the print data of the job information 1 are printed, and the recording failure check pattern 20 is printed on the succeeding recording failure check page 19. Then, the page 2 of the first copy and the page 2 of the second copy of the print data of the job information 1 are printed, and the recording failure check pattern 20 is printed on the succeeding recording failure check page 19. Moreover, the pages 1 to 3 of the first copy of the print data of the job information 2 are printed, and the recording failure check pattern 20 is then printed on the succeeding recording failure check page 19.

Furthermore, as illustrated in FIG. 3D, completion of the recording process executed according to one printing instruction issued from the higher-order device 3 may be set as 1 job for print data composed of a plurality of pages.

Namely, the page 1 of the first copy and the page 1 of the second copy of the print data of the job information 1 are printed, the page 2 of the first copy and the page 2 of the second copy of the print data of the job information 1 are printed, and the recording failure check pattern 20 is then printed on the succeeding recording failure check page 19. Moreover, the pages 1 to 3 of the first copy of the print data of the job information 2 are printed, and the recording failure check pattern 20 is printed on the succeeding recording failure check page 19.

Furthermore, depending on an instruction issued from the higher-order device 3, completion of the recording process executed for a plural number of copies of the same piece of print data, or completion of the recording process executed according to one printing instruction may be selectively set as 1 job.

The check image obtaining unit 7 is provided on a further downstream side of the conveyance path of the recording medium 1 than the recording unit 6. According to a notification from the controlling unit 4, the check image obtaining unit 7 reads an image when the recording failure check pattern 20 recorded on the recording medium 1 by the recording unit 6 passes through, and outputs the check image data. As a result, a recording failure can be determined with high efficiency.

The check image obtaining unit 7 may be configured as an external device separate from the image recording apparatus 2. The check image obtaining unit 7 is, for example, a line sensor module composed of light-receiving elements, arranged in the form of an array, of three colors such as R (red), G (green) and B (blue), and an illumination device, not illustrated, for illuminating the recording medium 1 in order to obtain an image.

The check image obtaining unit 7 obtains an image on the recording medium 1 on which the recording process has been executed, for example, at a resolution of 600 dpi. Moreover, the check image obtaining unit 7 has a resolution of, for example, 8 bits for each of the three colors such as R, G and B. Therefore, the check image obtaining unit 7 outputs 24-bit check image data.

The medium collecting unit 17 is configured so that the recording media 1 ejected after the recording process are stacked therein and a user can take the recording media 1 therefrom. Moreover, the medium collecting unit 17 also functions as a buffer for adjusting processing speeds of the image recording apparatus 2 and a postprocessor if the postprocessor such as a folding machine or the like, not illustrated, is connected to the image recording apparatus 2.

A flow of the printing process is described next with reference to FIG. 4.

The printing process is executed by the recording unit 6 on a recording medium 1 cut in a predetermined length in S1 (step 1). Then, the flow goes to S2.

In S2, whether or not the current page is the last page of the above described 1 job is determined by the print data processing unit 9 (see FIG. 1). If the determination results in "NO", the flow goes back to S1. If the determination results in "YES", the flow goes to S3.

Namely, in S2, for example, in the above described print format illustrated in FIG. 3A, the last page of each copy is the last page of 1 job. In contrast, in the print format illustrated in FIG. 3B, the last page of the job information 1 or 2 is the last page of 1 job.

Additionally, in the print format illustrated in FIG. 3C, the last page of each piece of print data in the job information 1 or 2 is the last page of 1 job. In the print format illustrated in FIG. 3D, the last page of the last copy of the job information 1 or 2 is the last page of 1 job.

In S3, the recording failure check pattern 20 is printed on a page next to the last page of 1 job. Then, the flow goes to S4.

In S4, whether or not the printing process has been executed is determined. If the determination results in "NO", the flow goes back to S1. If the determination results in "YES", the printing process is terminated.

A flow of a recording failure detection process is described next with reference to FIG. 5.

In S11, whether or not the current page is a page on which the recording failure check pattern 20 is recorded is determined. If the determination results in "NO", the flow goes back to the first step S11. If the determination results in "YES", the flow goes to S12.

In S12, the recording failure check pattern 20 is checked by the recording failure checking unit 8. Then, the flow goes to S13.

In S13, whether or not there is a recording failure is determined. If the determination results in "NO", the flow goes to S15. If the determination results in "YES", the flow goes to S14. In S14, the recording failure is notified to the higher-order device 3. Then, the flow goes to S15. In S15, whether or not the printing has been performed is determined. If the determination results in "NO", the flow goes back to S11. If the determination results in "YES", the process is terminated.

Figure 6:
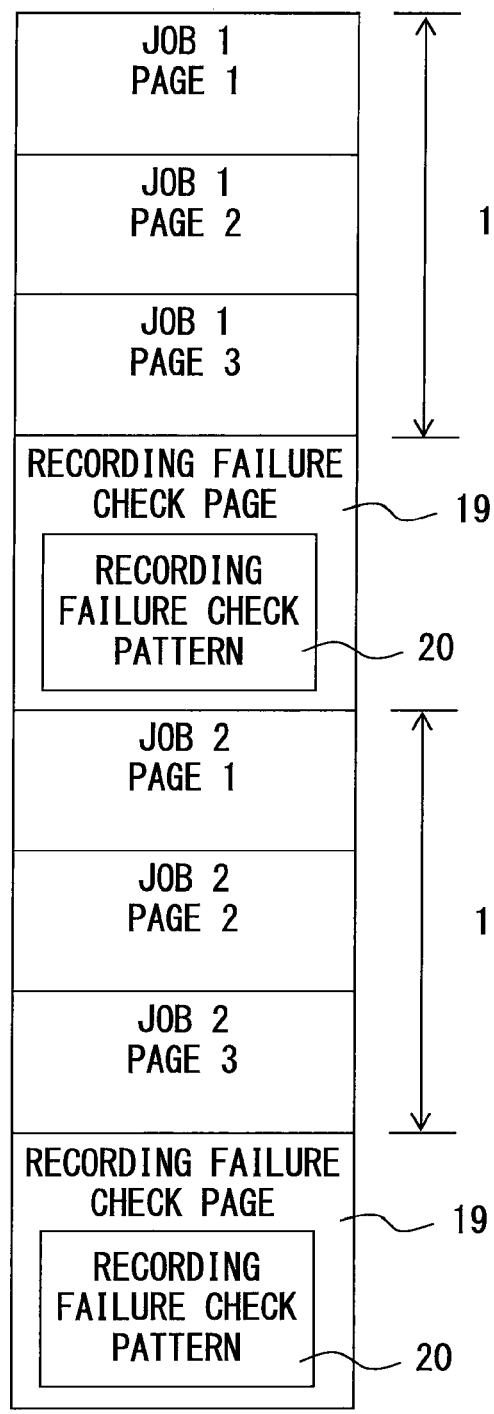
FIG. 6 is a conceptual schematic of a recording medium after being printed.

FIG. 6 is a conceptual schematic of the recording medium 1 after being printed, similar to the above described FIG. 3.

The recording medium 1 is a cut sheet that is cut in a predetermined length. FIG. 6 illustrates a state where a plurality of such recording media 1 are successively arranged in the conveyance direction.

In FIG. 6, job information 1 and 2 are configured with print data respectively composed of three pages. On a page next to the last page of 1 job, a recording failure check page 19 for checking a recording failure is provided.

FIG. 7A illustrates an example of a recording failure check pattern 20 formed on a page next to the last page on which the recording process for 1 job has been executed.

In entire band-shaped areas 21 to 24 that configure the recording failure check pattern 20, the recording process is executed respectively by the recording heads 16-1 to 16-4. These areas are arranged in the order of the K, C, M and Y colors in the conveyance direction. Moreover, a width of recording ranges of the areas 21 to 24 in the main scanning direction is a maximum width printable on the recording medium 1 in accordance with the size of the recording medium 1.

FIG. 7B is an enlarged view of an area 25 illustrated in FIG. 7A, and illustrates an example of a case where there is no recording failure. This area 25 is recorded in the M color. If there is no recording failure, the area 25 is recorded as a continuous band-shaped area in the M color as indicated by 25a.

FIG. 7C is an enlarged view of the area 25 illustrated in FIG. 7A, and illustrates an example of a case where there is a recording failure. This area 25 is recorded in the M color. If there is a recording failure, the band-shaped area in the M color is discontinuous in a portion of the recording failure as indicated by 25c.

The check image obtaining unit 7 obtains an image of the recording failure check pattern 20, and outputs the check image data. The recording failure checking unit 8 in the controlling unit 4 obtains the check image data, and checks a recording failure by checking the discontinuous portion of the band-shaped area indicated by 25c of FIG. 7C respectively for the K, C, M and Y colors.

As described above, in this embodiment, the recording failure check process by the recording failure checking unit 8 (see FIG. 1) is executed for each job. Accordingly, it is verified that there is no problem in an immediately preceding job if no recording failure is detected.

If a recording failure is detected by the recording failure checking unit 8, the recording failure is proved to have occurred during the immediately preceding job. Therefore, there is no need to again execute the recording process respectively for all jobs, and the process is restarted at the immediately preceding job, whereby a lot of recording failures can be prevented from occurring.

Additionally, according to this embodiment, the recording failure check pattern 20 is not provided for each page. Therefore, the quantity of recording media that become unnecessary and are discarded can be reduced. Moreover, the recording failure check pattern 20 and an originally needed output recording medium can be easily sorted.

Modification Example 1

Figure 8A:
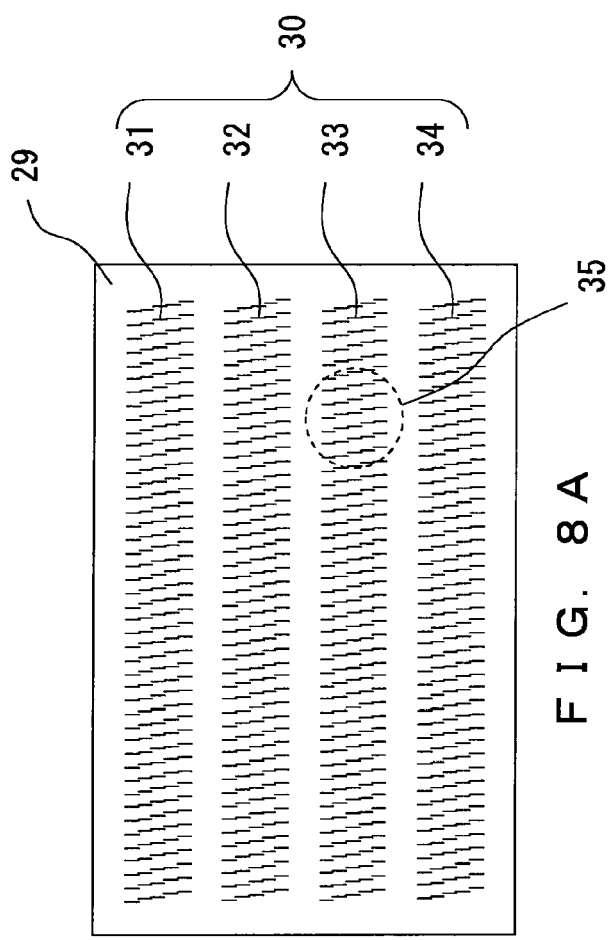
FIGS. 8A to 8C illustrate one example of another recording failure check pattern.

FIG. 8A illustrates another example of the recording failure check pattern 20 formed on a page next to the page on which the recording process for 1 job has been executed.

In areas 31 to 34 that configure a recording failure check pattern 30, the recording process is respectively executed by the recording heads 16-1 to 16-4. One short bar is recorded by one nozzle, and short bars are shifted in the sub-scanning direction so that those formed by adjacent nozzles do not overlap.

Additionally, the areas 31 to 34 are respectively recorded in the K, C, M and Y colors. Moreover, a width of recording ranges of the areas 31 to 34 is a maximum width printable on the recording medium 1 in accordance with the size of the recording medium 1.

Figure 8C:
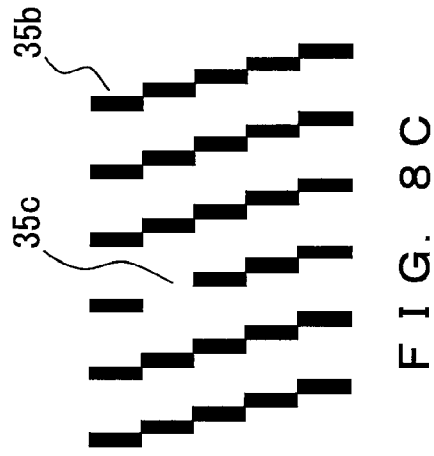
Figure 8B:
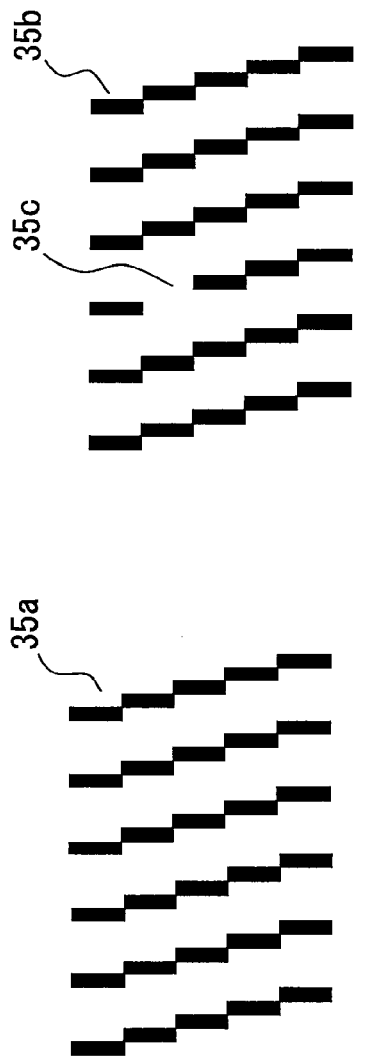

FIG. 8B is an enlarged view of the area 35 illustrated in FIG. 8A, and illustrates an example of a case where there is no recording failure. The area 35 is recorded in the M color. If there is no recording failure, the recording process is executed by all the nozzles without making a short bar fall off as indicated by 35a.

FIG. 8C is an enlarged view of the area 35 illustrated in FIG. 8A, and illustrates an example of a case where there is a recording failure. The area 35 is recorded in the M color. If there is a recording failure, a short bar to be originally recorded by a particular nozzle falls off as in a portion indicated by 35c.

The check image obtaining unit 7 obtains an image of the recording failure check pattern 30, and outputs check image data. The recording failure checking unit 8 of the controlling unit 4 obtains the check image data, and checks a recording failure by checking whether or not a short bar falls off as indicated by 35c of FIG. 8C respectively for the K, C, M, and Y colors.

A separator marker (not illustrated) may be printed along with the recording failure check pattern 30 on a recording failure check page 29. Namely, a separator marker, for example, in the M color is recorded so that the recorded color appears in a front edge of the recording failure check page 29. As a result, this separator marker functions also as a marker for recognizing a break of 1 job.

With the recording failure check using the pattern illustrated FIGS. 8A to 8C as in this modification, a nozzle that causes a recording failure can be identified since a fall-off position can be identified.

Modification Example 2

Figure 9:
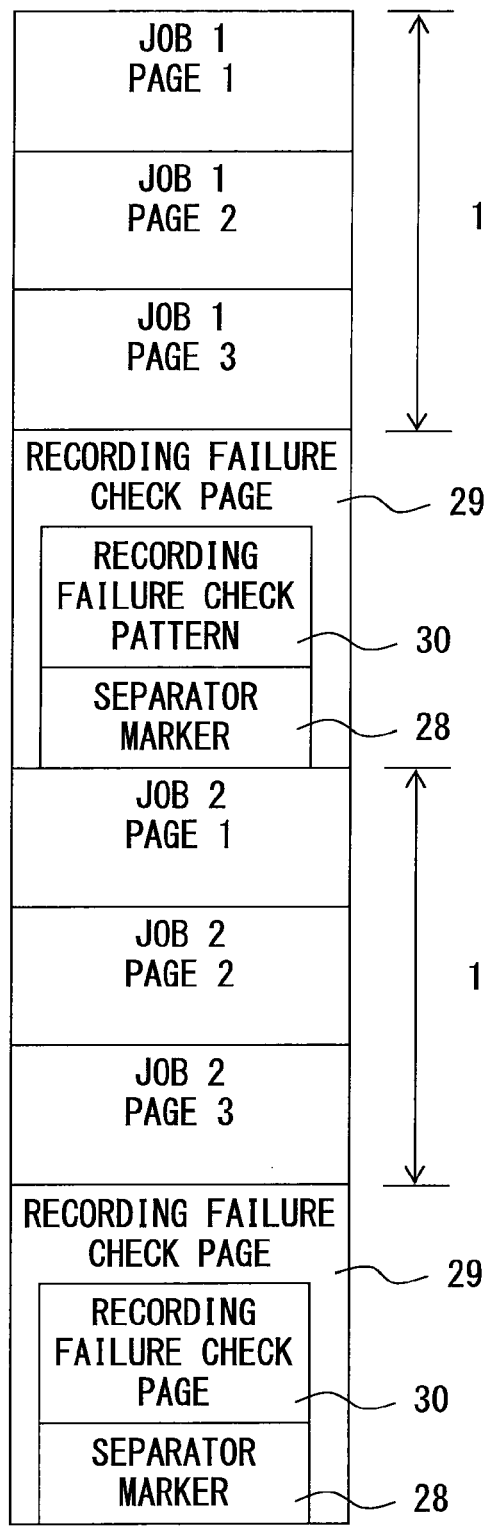
FIG. 9 is a conceptual schematic of a recording medium after being printed.

FIG. 9 is a conceptual schematic of a recording medium 1 after being printed in another modification example.

In FIG. 9, job information 1 and 2 are configured with print data respectively composed of three pages. At the end of a so-called 1 job, a recording failure check page 29 for checking a recording failure is provided.

On the recording failure check page 29, a recording failure check pattern 30 and a separator marker 28 are printed. With the separator marker 28, a break of 1 job can be identified by detecting the separator marker 28, for example, when recording media 1 are stacked for each job.

Figure 10:
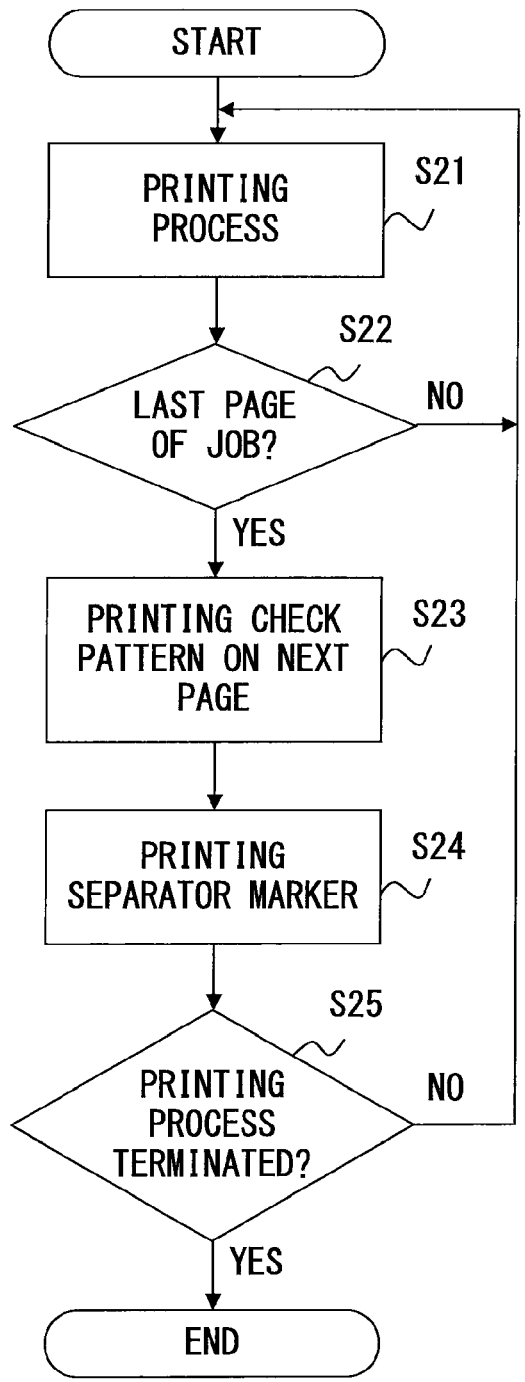
FIG. 10 is a flowchart of a printing process.

A flow of a printing process when a recording process of the separator marker 28 is executed is described next with reference to FIG. 10.

In S21, the printing process is executed by the recording unit 6 on a recording medium 1 cut in a predetermined length. Then, the flow goes to S22.

In S22, whether or not the current page is the last page of 1 job is determined by the print data processing unit 9. If the current page is not the last page ("NO"), the flow goes back to S21. If the current page is the last page ("YES"), the flow goes to S23. Whether or not the current page is the last page of 1 job is determined in a similar manner as in the above described FIG. 4.

In S23, the recording failure check pattern 30 is printed on a page next to the last page of 1 job. Then, the flow goes to S24. In S24, the separator marker 28 is printed below the recording failure check pattern 30. The separator marker 28 is recorded at an edge of a page. This makes it easy to identify the separator marker 28 when recording media 1 are stacked.

In S25, whether or not the printing process has been executed is determined. If the determination results in "NO", the flow goes back to S21. If the determination results in "YES", the printing process is terminated.

Modification Example 3

FIG. 11 illustrates another example of a recording failure check pattern 40 formed on a page next to a page on which the recording process for 1 job has been executed.

In FIG. 11, a recording process of a separator marker 45 for indicating a break of a job is executed in the last area of the page in addition to the recording failure check pattern 40 on the recording failure check page 39. This separator marker 45 is recorded in the M color in the entire last area so that the recorded color appears in a front edge of a recording medium 1.

As a result, the page on which the recording failure check pattern 40 has been recorded functions as a marker for indicating a break of 1 job, and a user can easily identify a break of 1 job among recording media 1 stacked in the medium collecting unit 17.

Additionally, if a postprocessor such as a folding machine or a binding machine is connected and used at a stage succeeding the image recording apparatus 2, processing can be easily performed in the postprocessor by detecting a break of 1 job with a sensor in accordance with the separator marker 45 with the use of the recording failure check pattern 40 illustrated in FIG. 11.

Furthermore, the separator marker 45 is assumed to be recorded in the M color. However, the separator marker 45 may be recorded in a color other than the M color, or in a combination of colors.

Moreover, the separator marker 45 is assumed to be recorded in the entire area. However, the separator marker 45 may be implemented, for example, as a stripe pattern recorded at an edge of a paper sheet.

Still further, the separator marker 45 is formed at a rear edge of paper. However, the separator marker 45 may be recorded at a front edge of paper.

Moreover, the separator marker 45 may be provided so that part of the recording failure check pattern 40 in the areas 41 to 44 is recorded to extend up to an edge of the recording medium 1 without being provided separately from the areas 41 to 44. The separator marker 45 may be used also as any of the areas 41 to 44.

Second Embodiment

A second embodiment according to the present invention is described next with reference to the drawings.

Members identical or equivalent to those of the first embodiment are denoted with the same reference numerals.

Figure 12:
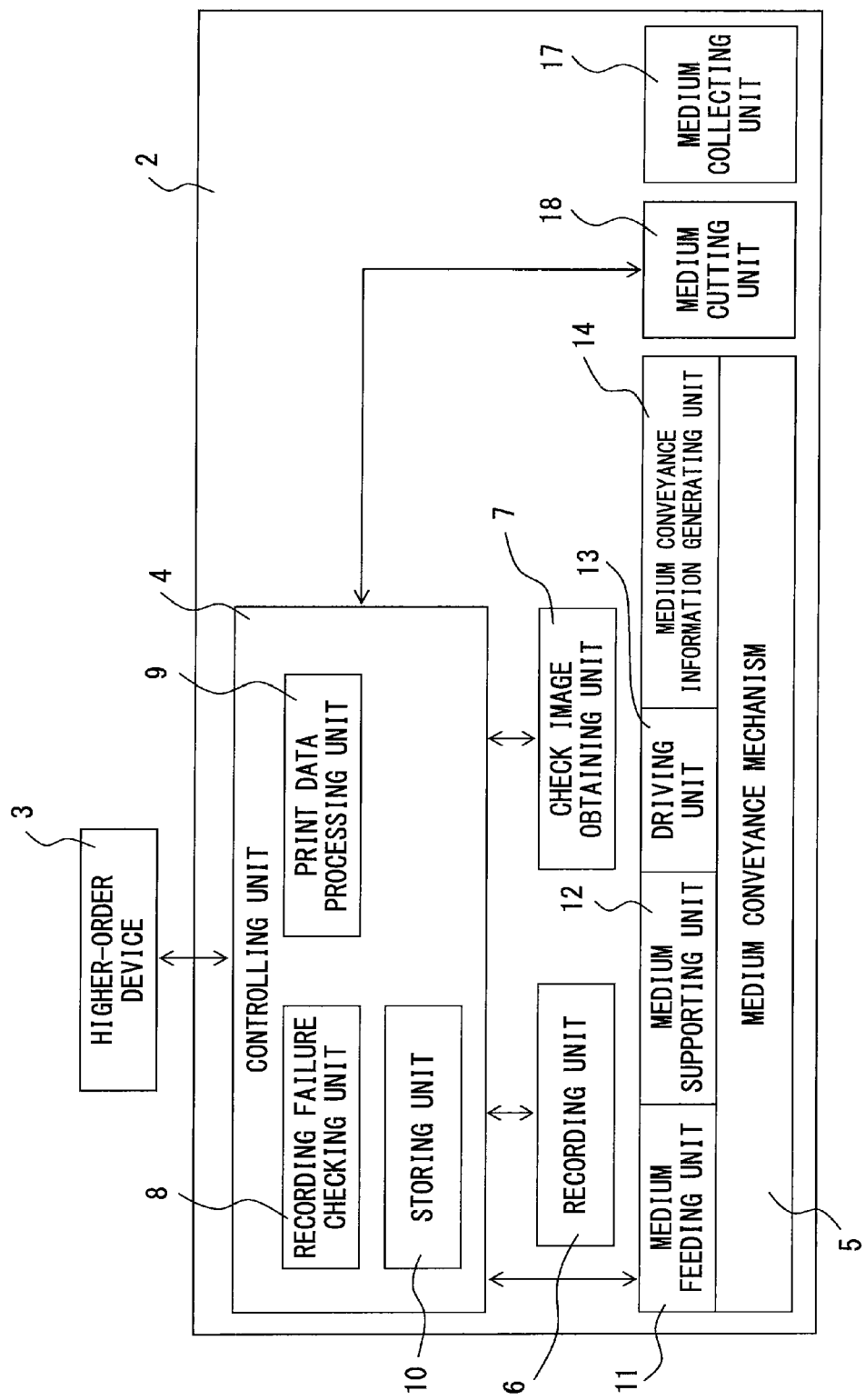
FIG. 12 is a block diagram illustrating functions of an image recording system according to a second embodiment of the present invention.
Figure 13:
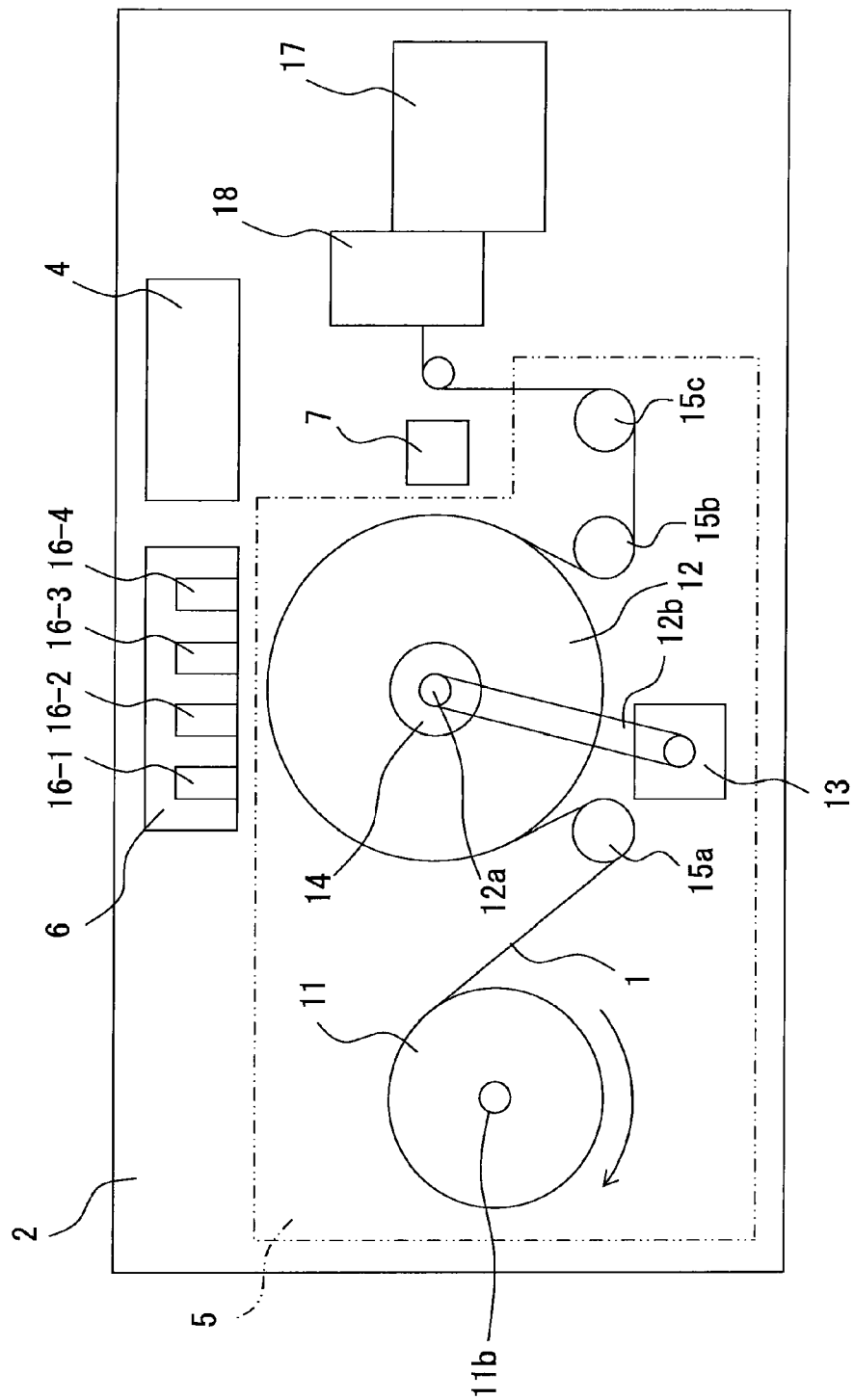
FIG. 13 illustrates a configuration of a mechanism portion of the image recording system according to the second embodiment.

FIG. 12 is a block diagram illustrating functions of an image recording system. FIG. 13 illustrates a configuration of a mechanism portion.

In this embodiment, a recording medium 1 is formed in the shape of a sheet. The recording medium 1 is, for example, continuous paper or film wound in the form of a roll in its initial state.

To the image recording apparatus 2, a higher-order device 3 is connected via a LAN (Local Area Network) or the like. The higher-order device 3 transmits print data (image data) composed of an image, a character and the like.

The higher-order device 3 transmits, to the image recording apparatus 2, an instruction to execute a recording process, and then transmits print data that is a base of the recording process in a format such as PostScript or the like.

The image recording apparatus 2 receives the print data transmitted from the higher-order device 3, executes the recording process for recording an image on the recording medium 1 by jetting and establishing ink onto the recording medium 1 based on the print data, and also executes a jetting failure detection process for detecting a jetting failure of ink, which can possibly occur at the time of the recording process.

The image recording apparatus 2 includes at least a controlling unit 4, a medium conveyance mechanism 5, a recording unit 6, a check image obtaining unit 7, a medium collecting unit 17, and a medium cutting unit 18. Since a configuration of the controlling unit 4 is the same as the above described first embodiment, its explanation is omitted.

The medium conveyance mechanism 5 conveys the recording medium 1. The medium conveyance mechanism 5 is composed of a medium feeding unit 11, a medium supporting unit 12, a driving unit 13, a medium conveyance information generating unit 14, and rollers 15a, 15b, 15c. The medium feeding unit 11 feeds the recording medium 1. The recording medium 1, wound in the form of a roll around the medium support member 11b, is supported to be rotatable.

The medium supporting unit 12 is composed of a medium supporting unit holding member 12a, and a driving unit 13 such as a motor or the like connected to the medium supporting unit holding member 12a by a power transfer member 12b. The recording medium 1 is conveyed by rotating the medium supporting unit holding member 12a via the power transfer member 12b with the driving of the driving unit 13.

The plurality of rollers 15a, 15b, 15c are provided on a conveyance path so that the recording medium 1 is conveyed on a desired route. The medium conveyance information generating unit 14 is configured with, for example, a rotary encoder, and is connected to the medium supporting unit holding member 12a. The medium conveyance information generating unit 14 generates a pulse signal corresponding to an amount of rotation of the medium supporting unit holding member 12a, namely, an amount of conveyance (an amount of move) of the recording medium 1, and notifies the controlling unit 4 of the amount with the pulse signal.

Since the recording process executed by the recording unit 6 is the same as that of the above described first embodiment, its explanation is omitted. Moreover, because a configuration of the check image obtaining unit 7 is the same as that of the above described first embodiment, its explanation is omitted.

The medium cutting unit 18 cuts the recording medium 1, on which the recording process has been executed, into pages.

The medium collecting unit 17 is configured so that the recording medium 1 cut into pages by the medium cutting unit 18 and ejected are stacked therein and a user can take the recording medium 1 therefrom. Moreover, the medium collecting unit 17 can also function as a buffer for adjusting processing speeds of the image recording apparatus 2 and a postprocessor if the postprocessor such as a folding machine or the like, not illustrated, is connected to the image recording apparatus 2.

Figure 4:
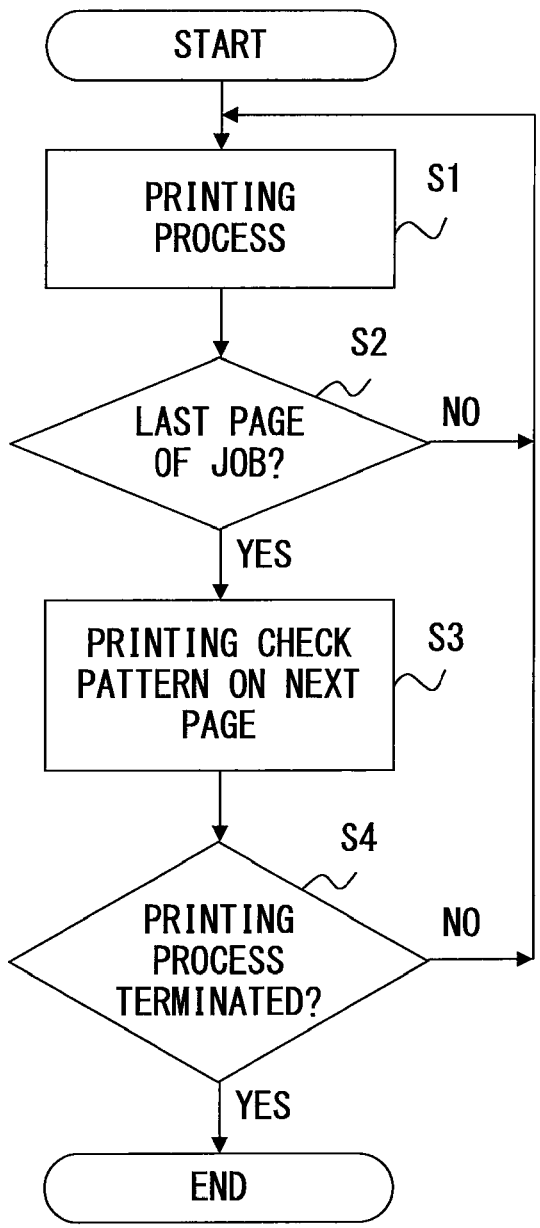
FIG. 4 is a flowchart of the printing process.
Figure 5:
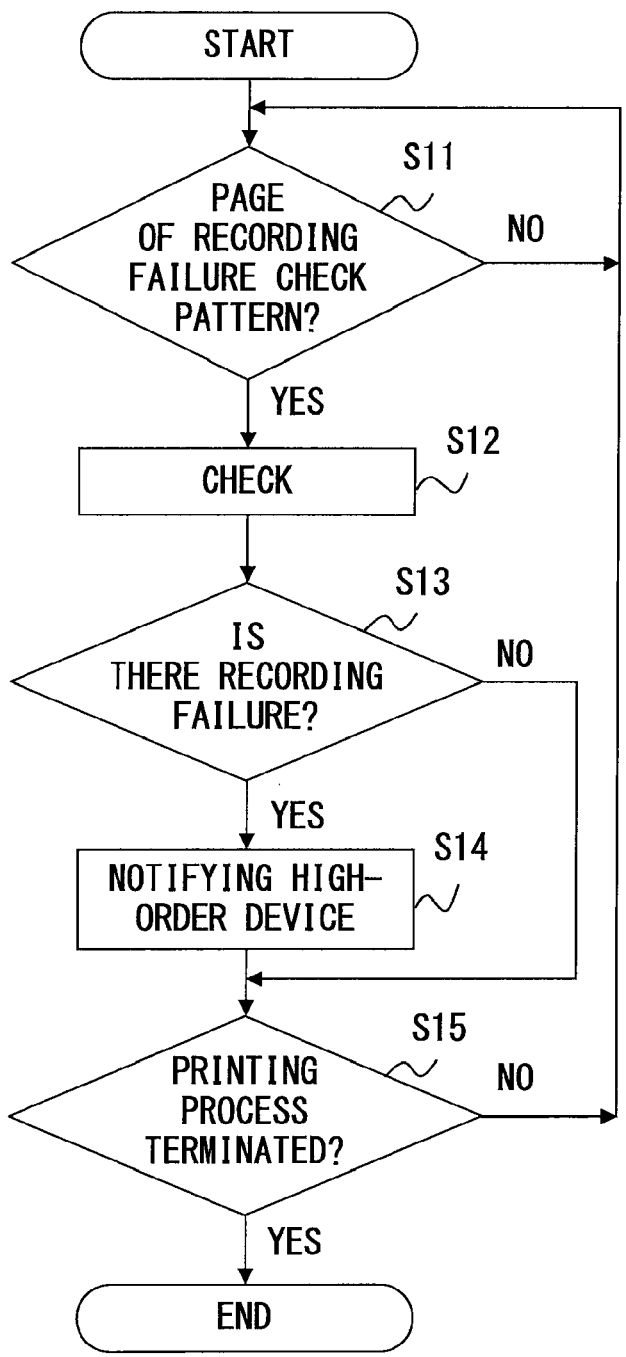
FIG. 5 is a flowchart of a recording failure check process.

Flows of a printing process and a recording failure check process, which are executed in the second embodiment, are identical to those of the first embodiment illustrated in FIGS. 4 and 5. Therefore, their explanations are omitted.

Figure 14:
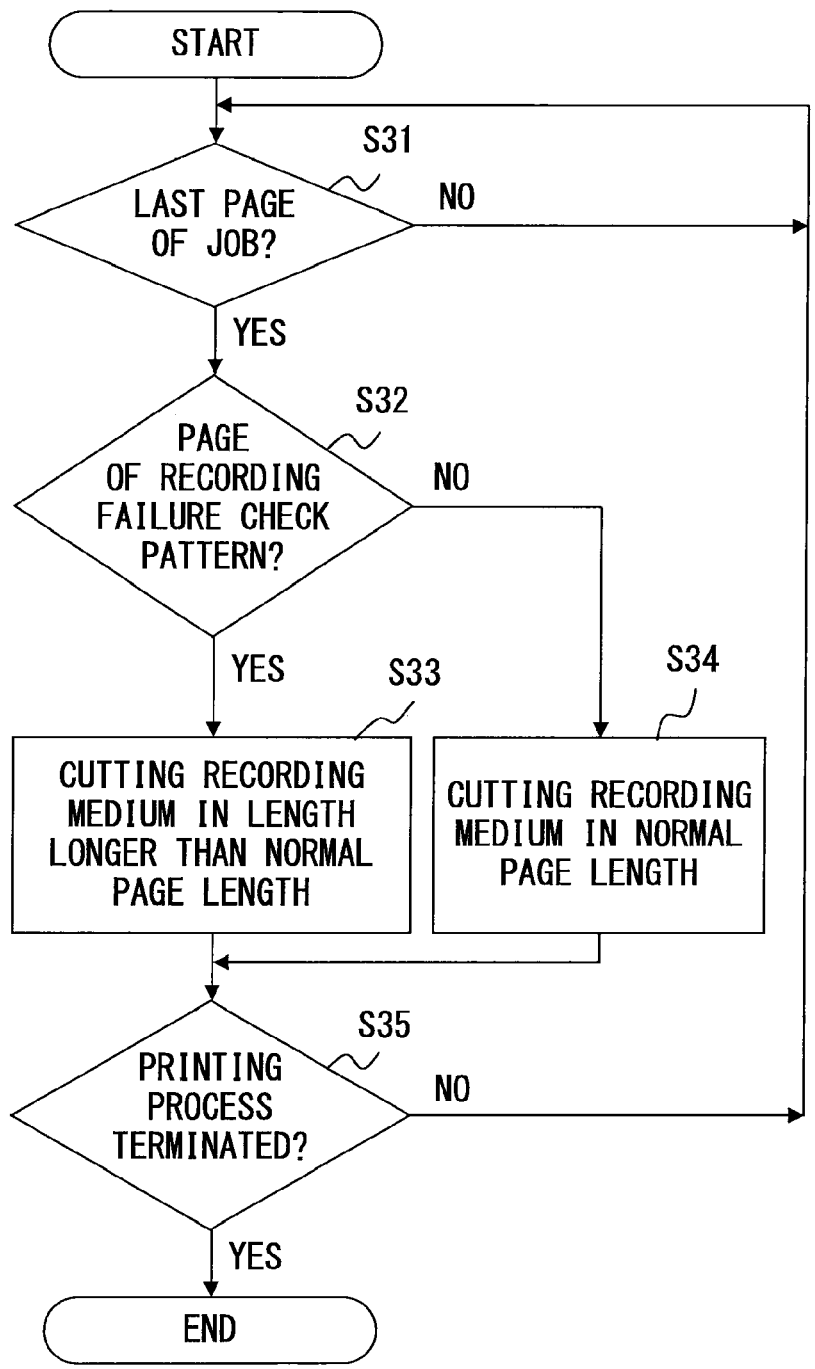
FIG. 14 is a flowchart illustrating a recording medium cutting process.

A flow of a cutting process of the recording medium 1 is described next with reference to FIG. 14.

Initially, whether or not the current page is the last page of a job is determined in S31. This determination is made by the controlling unit 4 based on a signal transmitted from the medium conveyance information generating unit 14. If the current page is not the last page of the job, the flow goes back to S31. If the current page is the last page of the job, the flow goes to S32. In S32, whether or not the current page is a recording failure check page is determined. If the determination results in "YES", the flow goes to S33. If the determination results in "NO", the flow goes to S34.

In S33, the recording medium 1 is cut in a size longer than a normal size. Then, the flow goes to S35. Assuming that the length of a normal page is L, the recording medium 1 is cut in a length of L+A. In S34, the recording medium 1 is cut in the normal page length L. Then, the flow goes to S35. In S35, whether or not the printing process has been executed is determined. If the determination results in "NO", the flow goes back to S31. If the determination results in "YES", the printing process is terminated.

FIG. 15 is a conceptual schematic of the recording medium 1 after being printed.

In this figure, job information 1 and 2 are print data respectively composed of three pages. At the end of 1 job, a recording failure check page 49 for checking a recording failure is provided. The length L of the recording medium 1 indicates the length of a page, on which the normal recording process has been executed and which has been cut. For example, if the recording process is executed on an A4-sized landscape, L is 210 mm.

The length L of a page is not limited to 210 mm. The length L may be varied according to the length of a page on which the recording process is executed. Moreover, the length L+A of a page indicates a length of the recording failure check page 49 after being cut.

For example, if the normal recording process is executed on an A4-sized landscape, the recording failure check page 49 is cut in a length longer by 10 mm than a page, on which the normal printing process has been executed, by setting L+A to 220 mm. As a result, a user can identify a break of 1 job when taking out pages.

A recording failure check pattern recorded on a recording failure check page, and a detecting method thereof are identical to those of the first embodiment illustrated in FIG. 7 or 8. Therefore, their explanations are omitted.

Moreover, the length of the recording failure check page is assumed to be L+A. However, the length is not limited to this one. The length of the recording failure check page may be assumed to be, for example, the normal length L.

According to this embodiment, the recording failure check process by the recording failure checking unit 8 is executed for each job in a similar manner as in the first embodiment.

Therefore, it is verified that there is no problem in an immediately preceding job if a recording failure is not detected.

Additionally, if a recording failure is detected by the recording failure checking unit 8, the recording failure is proved to have occurred during an immediately preceding job. Accordingly, there is no need to again execute the recording process for all pieces of job information, and the recording process is restarted at the immediately preceding job, whereby many recording failures can be prevented from occurring.

Furthermore, according to this embodiment, the length of the recording failure check page 49 is set to a length longer than a normal page, whereby a user can easily identify a break of 1 job stacked and ejected. Moreover, a page indicating a break of 1 job, and a recording failure check are recorded on the same page, thereby eliminating the need for using extra paper.

Modification Example 1

FIG. 16 illustrates another example of a recording failure check pattern 50 formed on a page next to a page on which the recording process for one job has been executed.

In this modification example, the recording failure check page 49 having the length L+A longer than the length L of a normal page is used. On the recording failure check page 49, a separator marker 55 indicating a break of 1 job to a user is recorded in an area 56 of a longer recording medium.

As a result, the user can more easily identify a break of 1 job stacked and ejected.

Moreover, in this modification example, the separator marker 55 formed in the area 56 of FIG. 16 is formed in a rear edge of the recording medium 1 based on the assumption that the medium collecting unit 17 aligns front edges of recording media 1. However, the separator marker 55 may be formed at a front edge of a recording medium 1 by assuming that the medium collecting unit 17 aligns rear edges of recording media 1.

Additionally, in this modification example, the length of the recording failure check page is assumed to be L+A. However, the length is not limited to this one. For example, the recording failure check page may be cut by setting its length to the normal length L. Moreover, the separator marker 55 may be recorded at an edge of a page of the recording failure check pattern 50 cut in the normal length.

Modification Example 2

FIG. 17 illustrates another example of a recording failure check pattern 60 formed on the next page after the recording process of 1 job is completed.

In this modification example, a recording failure check page 59 has the length L+A longer than the length L of a normal page. Moreover, part of the recording failure check pattern 60 recorded in areas 61 to 64 is formed in a portion that protrudes from the normal page length L. As a result, the recording failure check pattern 60 also functions as a separator marker although the above described separator marker 55 (see FIG. 16) is not recorded.

This eliminates the need for recording a separator marker in addition to the recording failure check pattern 60.

Third Embodiment

Figure 18:
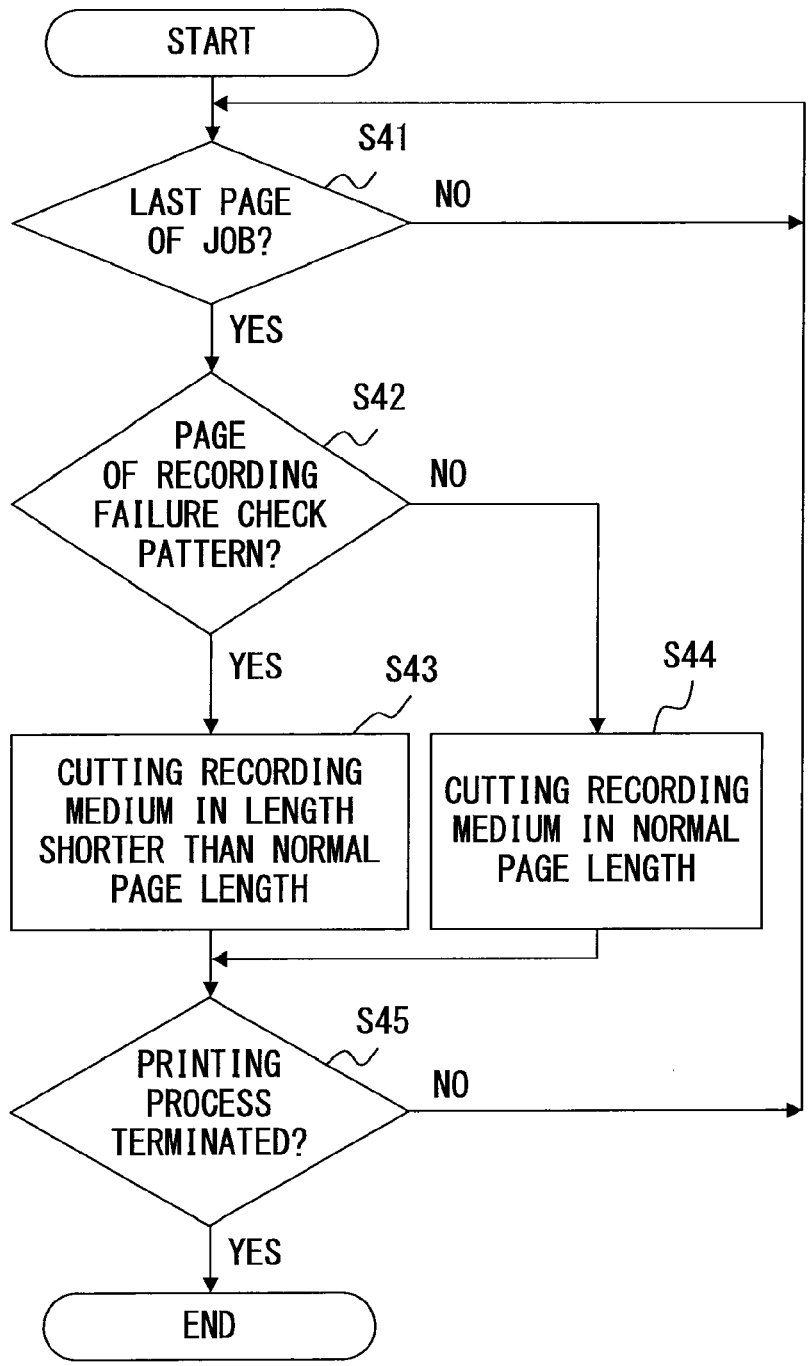
FIG. 18 is a flowchart of a recording medium cutting process executed by an image recording system according to a third embodiment of the present invention.

A third embodiment according to the present invention is described next with reference to FIGS. 18 and 19.

A block diagram illustrating functions of an image recording system according to this embodiment, and a schematic diagram illustrating a configuration of a mechanism portion are identical to those of the second embodiment illustrated in FIGS. 12 and 13. Therefore, their explanations are omitted.

Also flows of a printing process and a recording failure check process in the third embodiment are identical to those of the first embodiment illustrated in FIGS. 4 and 5. Therefore, their explanations are omitted.

A cutting process of a recording medium is described next with reference to FIG. 18.

Initially, whether or not the current page of a conveyed continuous recording medium 1 is the last page of 1 job is determined in S41. This determination is made by the controlling unit 4 based on a signal transmitted from the medium conveyance information generating unit 14. If the current page is not the last page of 1 job, the flow goes back to S41. If the current page is the last page of 1 job, the flow goes to S42. In S42, whether or not the current page is a recording failure check page is determined. If the determination results in "YES", the flow goes to S43. If the determination results in "NO", the flow goes to S44.

In S43, the recording medium 1 is cut in a length L-A shorter than the normal length L. Then, the flow goes to S45. Moreover, in S44, the recording medium 1 is cut in the normal page length L. Then, the flow goes to S45. In S45, whether or not the printing process has been executed is determined. If the determination results in "NO", the flow goes back to S41. If the determination results in "YES", the cutting process is terminated.

In this embodiment, the recording medium 1 is cut in the normal page length L, or in the length L-A shorter than the normal length. In this way, a break of 1 job can be identified as will be described later when recording media 1 are stacked.

FIG. 19 is a conceptual schematic of the recording medium 1 after being printed.

In this figure, job information 1 and 2 are print data respectively composed of three pages. At the end of 1 job, a recording failure check page 69 for checking a recording failure is provided. The page length L indicates a length of a page, on which the normal recording process has been executed and which has been cut. If the recording process is executed, for example, on an A4-sized landscape, L is 210 mm.

In this embodiment, the page length L is not limited to 210 mm, and the page length L may be varied according to the length of a page on which the recording process is executed. Moreover, L-A indicates the length of the recording failure check page 69 after being cut. For example, if the normal recording process is executed on an A4-sized landscape, the recording medium 1 is cut in a length shorter by 10 mm than a page, on which the normal recording process has been executed, by setting L-A to 200 mm. In this way, a user can identify a break of 1 job when taking out recording media 1 stacked after being recorded.

Namely, if there is a page shorter than a normally printed page in a state where many recording media 1 are stacked after being recorded, a space occurs between pages that precede and succeed the shorter page. Accordingly, a user can easily identify a break of 1 job.

Additionally, as in this modification example, the length of the recording failure check page may be set to L-A that is shorter than the normal page length, and a separator marker (colored portion) may be recorded at an edge of a shorter page of the recording failure check pattern 50.

As a result, a user can identify the separator marker (colored portion) when viewing many recorded and stacked recording media 1 in a direction where front or rear edges of the recording media 1 are aligned in the conveyance direction. Therefore, the user can identify a break of 1 job.

The recording failure check pattern 70 recorded on the recording failure check page 69, and a detecting method thereof are identical to those in the first embodiment illustrated in FIG. 7 or 8. Therefore, their explanations are omitted.

According to this embodiment, the recording failure check process executed by the recording failure checking unit 8 is executed for each job in a similar manner as in the first embodiment. Accordingly, it is verified that there is no problem in an immediately preceding job if a recording failure is not detected. Moreover, if a recording failure is detected by the recording failure checking unit 8, the recording failure is proved to have occurred during the immediately preceding job. Therefore, there is no need to again execute the recording process for all pieces of job information, and the recording process is restarted at the immediately preceding job, whereby many recording failures can be prevented from occurring.

Furthermore, in this embodiment, the length L-A of the recording failure check page 69 is set to a length shorter than the normal page length, whereby a user can easily identify a break of stacked and ejected pages of 1 job.

What is claimed is:

1. An image recording system including a recording unit for recording an image on a recording medium based on job information including print data, comprising:
    an image capturing unit for capturing an image of the recording medium on which the image is recorded;
    a higher-order device having an input unit for selecting the job information in predetermined printing units;
    a print data processing unit for controlling to record a predetermined check image before the print data is recorded on the recording medium or after the print data is recorded on the recording medium by the printing units; and
    a recording failure checking unit for determining whether or not an ink letting failure occurs on the recorded check image;
    wherein the recording medium is a cut sheet that is cut in a predetermined length, the check image is recorded at an edge of the cut sheet on an upstream side or a downstream side of a conveyance direction, and a separator marker for sorting the cut sheet is recorded by the recording unit in proximity of the check image.

2. The image recording system according to claim 1, wherein the separator marker is used also as the check image.

3. An image recording system including a recording unit for recording an image on a continuous recording medium based on job information including print data, comprising:

an image capturing unit for capturing an image of the recording medium on which the image is recorded;

a higher-order device having an input unit for selecting the job information in predetermined printing units;

a print data processing unit for controlling to record a predetermined check image before the print data is recorded on the recording medium or after the print data is recorded on the recording medium by the printing units; and a recording failure checking unit for determining whether or not an ink letting failure occurs on the recorded check image;

a cutting unit for cutting the continuous recording medium into sheets of a predetermined size, wherein the cutting unit cuts, in a same size, a sheet on which the print data is recorded and a sheet on which the check image is recorded.

4. The image recording system according to claim 3, wherein the check image is recorded at an edge of the recording medium on the upstream side or the downstream side of a conveyance direction of the recording medium cut in the same size, and a separator marker is recorded by the recording unit in proximity of the check image.

5. An image recording system including a recording unit for recording an image on a continuous recording medium based on job information including print data, comprising:

an image capturing unit for capturing an image of the recording medium on which the image is recorded;

a higher-order device having an input unit for selecting the job information in predetermined printing units;

a print data processing unit for controlling to record a predetermined check image before the print data is recorded on the recording medium or after the print data is recorded on the recording medium by the printing units; and a recording failure checking unit for determining whether or not an ink letting failure occurs on the recorded check image, a cutting unit for cutting the continuous recording medium in a predetermined size, wherein the cutting unit cuts, in a different size, a sheet on which the print data is recorded and a sheet on which the check image is recorded.

6. The image recording system according to claim 5, wherein a portion in which the check image is recorded is cut to be longer in a conveyance direction of the recording medium than a portion in which the print data is recorded.

7. The image recording system according to claim 6, wherein a separator marker is recorded by the recording unit in the portion which is cut to be longer and in which the check image is recorded.

8. The image recording system according to claim 7, wherein the separator marker is also used as the check image.

9. The image recording system according to claim 5, wherein the sheet on which the check image is recorded is cut to be shorter in a conveyance direction of the recording medium than the sheet on which the print data is recorded.

10. The image recording system according to claim 9, wherein a separator marker is recorded by the recording unit in a portion which is cut to be shorter and in which the check image is recorded.

11. A controlling method of an image recording system for recording an image on a recording medium based on job information including print data, comprising:

capturing an image of the recording medium on which the image is recorded; and selecting the job information in predetermined printing units, wherein:

the recording medium is a cut sheet cut in a predetermined length, a predetermined check image is recorded at an edge of the cut sheet on an upstream side or a downstream side of a conveyance direction, and a separator marker is recorded in proximity of the check image, a print data process is executed for performing a control for recording the check image before the print data is recorded on the recording medium or after the print data is recorded on the recording medium by predetermined printing units and a recording failure check for determining whether or not an ink jetting failure occurs in the recorded check image is performed.

12. The controlling method according to claim 11, wherein the separator marker is used also as the check image.

13. A controlling method of an image recording system for recording an image on a recording medium based on job information including print data, comprising:

capturing an image of the recorded recording medium; and cutting a continuous medium as the recording medium in a predetermined size, wherein:

a portion in which the print data is recorded and a portion in which a predetermined check image is recorded are cut in a same size, a print data process is executed for performing a control for recording the check image before the print data is recorded on the recording medium or after the print data is recorded on the recording medium by predetermined printing units, and a recording failure check for determining whether or not an ink jetting failure occurs in the recorded check image is performed.

14. The controlling method according to claim 13, wherein the separator marker is used also as the check image.

* * * * *